US009507998B2

(12) United States Patent
Ogawa et al.

(10) Patent No.: US 9,507,998 B2
(45) Date of Patent: Nov. 29, 2016

(54) PEDESTRIAN MOTION PREDICTING DEVICE

(75) Inventors: Masahiro Ogawa, Susono (JP); Toshiki Kindo, Yokohama (JP); Ryuji Funayama, Yokohama (JP); Tadaaki Sakamoto, Numazu (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 74 days.

(21) Appl. No.: 14/125,862

(22) PCT Filed: Jun. 13, 2011

(86) PCT No.: PCT/JP2011/063515
§ 371 (c)(1),
(2), (4) Date: Dec. 12, 2013

(87) PCT Pub. No.: WO2012/172629
PCT Pub. Date: Dec. 20, 2012

(65) Prior Publication Data
US 2014/0112538 A1    Apr. 24, 2014

(51) Int. Cl.
G06K 9/00    (2006.01)
G08G 1/16    (2006.01)
G06T 7/20    (2006.01)

(52) U.S. Cl.
CPC .......... G06K 9/00348 (2013.01); G06T 7/20 (2013.01); G08G 1/166 (2013.01)

(58) Field of Classification Search
None
See application file for complete search history.

(56) References Cited

U.S. PATENT DOCUMENTS

| 7,702,019 B2 | 4/2010 | Iwasaki et al. | |
| 2006/0177097 A1* | 8/2006 | Fujimura et al. | 382/103 |
| 2009/0041302 A1* | 2/2009 | Nagaoka | G06K 9/00805 382/103 |

FOREIGN PATENT DOCUMENTS

| JP | 3815689 B2 | | 8/2006 |
| JP | 2007-264778 A | | 10/2007 |
| JP | 2007264778 A | * | 10/2007 |
| JP | 2008-282097 A | | 11/2008 |
| JP | 2009042941 A | | 2/2009 |
| JP | 2009-244985 A | | 10/2009 |
| JP | 2010-079639 A | | 4/2010 |
| JP | 2010-102437 A | | 5/2010 |
| JP | 2010102437 A | * | 5/2010 |
| JP | 2010-165003 A | | 7/2010 |

* cited by examiner

Primary Examiner — Vikkram Bali
Assistant Examiner — Tracy Mangialaschi
(74) Attorney, Agent, or Firm — Sughrue Mion, PLLC

(57) ABSTRACT

A subject is to provide a pedestrian motion predicting device capable of accurately predicting a possibility of a rush out before a pedestrian actually begins to rush out. According to the embodiments, the pedestrian is detected from input image data, a portion in which the detected pedestrian is imaged is cut out from the image data, a shape of the pedestrian imaged in the cut-out partial image data is classified by collating the shape with a learning-finished identifier group or a pedestrian recognition template group, and the rush out of the pedestrian is predicted based on a result of the acquired classification.

6 Claims, 6 Drawing Sheets

PEDESTRIAN MOTION PREDICTING DEVICE

CROSS REFERENCE TO RELATED APPLICATIONS

This application is a National Stage of International Application No. PCT/JP2011/063515 filed Jun. 13, 2011, the contents of all of which is incorporated herein by reference in its entirety.

FIELD

The present invention relates to a pedestrian motion predicting device.

BACKGROUND

Patent Literature 1 discloses a pedestrian recognizing device that creates an edge image from image data input from an outside sensor, detects the opening degree W of the side leg portions of a pedestrian candidate and estimates the head portion of the pedestrian candidate, estimates the height H of the pedestrian candidate in accordance with the position of the head portion, and determines whether or not the ratio (W/H) of the leg portion W to the height H is equal to or more than a predetermined value α based on the height H and the opening degree W of the leg portions of the pedestrian candidate, thereby determining whether or not there is a possibility that the pedestrian candidate will walk across the road of a driver's own vehicle.

Note that, as other conventional technology documents, Patent Literatures 2 to 4 are exemplified. Patent Literature 2 discloses a pedestrian rush out predicting device that acquires time series variations of the positions and moving speeds of a pedestrian existing ahead of a driver's own vehicle and periphery information, compares the acquired time series variations of the position and moving speed with the patterns of the time series variations of the position and moving speed at the time the pedestrian rushes out into a roadway, and compares the acquired periphery information with the periphery information at the time the pedestrian rushes out into the roadway, thereby predicting whether or not the pedestrian will rush out into the roadway on which the driver's own vehicle travels. Patent Literature 3 discloses a pedestrian detecting device for a vehicle, wherein the device has database that stores two-dimensional shape data for detecting a pedestrian, estimates a first three-dimensional model based on the picked-up data of the detected pedestrian, and estimates a future motion of the pedestrian based on the first three-dimensional model. Patent Literature 4 discloses a pedestrian recognition supporting device that specifies representative points (a head portion, a neck portion, a hip joint, a knee joint, an ankle joint, and the like) of a pedestrian from image data, calculates the angle information of respective portions of the pedestrian based on the straight lines connecting the specified representative points to each other, a straight line parallel to a ground surface, and the like, thereby determining the moving state of the pedestrian based on the calculated angle information.

CITATION LIST

Patent Literature

Patent Literature 1: Japanese Patent Application Laid-open No. 2007-264778

Patent Literature 2: Japanese Patent Application Laid-open No. 2010-102437
Patent Literature 3: Japanese Patent Application Laid-open No. 2010-079639
Patent Literature 4: Japanese Patent Application Laid-open No. 2010-165003

SUMMARY

Technical Problem

However, since a pedestrian behavior is predicted by the ratio of the opening degree W of the leg portion to the height H, a problem arises in that a possibility of walking across a road cannot be determined until the pedestrian begins to walk across the road (specifically, until the pedestrian takes the first step of rush out). Further, there is also a problem that since the pedestrian behavior is predicted by the ratio of the opening degree W of the leg portion to the height H, a determination accuracy is deteriorated in a pedestrian who rushes out with a small step.

An object of the present invention which was made in view of the circumstances is to provide a pedestrian motion predicting device capable of accurately predicting a possibility of a rush out before a pedestrian actually begins to rush out.

Solution to Problem

The present invention is characterized in that in a pedestrian motion predicting device, a rush out of a pedestrian is predicted based on a result of a collation of a detected shape of the pedestrian with a previously prepared shape of a pedestrian having a possibility of a rush out.

In addition, it may be configured that the rush out of the pedestrian is predicted based on a combination of the shape of the pedestrian detected at a certain time and the shape of the pedestrian detected after the certain time.

Further, it may be configured that the detected shape of the pedestrian is recorded in time series, a periodicity of the recorded shape of the pedestrian in time series is analyzed, and the rush out of the pedestrian is predicted based on a change of the analyzed periodicity.

Further, it may be configured that the detected shape of the pedestrian is recorded in time series, whether or not a speed of the pedestrian is continuous is determined based on the recorded shape of the pedestrian in time series, and the rush out of the pedestrian is predicted based on a result of the determination.

Further, it may be configured that at least one of a forward inclination posture, an upper body direction, an opening of legs in a front-rear direction, and an opening of the legs in a side direction of the pedestrian is acquired as the shape of the pedestrian.

Advantageous Effects of Invention

Since the present invention predicts the rush out of a pedestrian based on the result of the collation of the detected shape of the pedestrian with a previously prepared shape of a pedestrian who has a possibility of a rush out the present invention can achieve an effect that a possibility of a rush out can be accurately predicted before a pedestrian begins to actually rush out.

DESCRIPTION OF EMBODIMENTS

Embodiments of a pedestrian motion predicting device according to the present invention will be explained below in detail based on the drawings. Note that the present invention is by no means limited by the embodiments.

[First Embodiment]

A configuration of a pedestrian motion predicting device according to a first embodiment and an operation carried out by the pedestrian motion predicting device will be explained in detail referring from FIG. 1 to FIG. 6.

Figure 1:
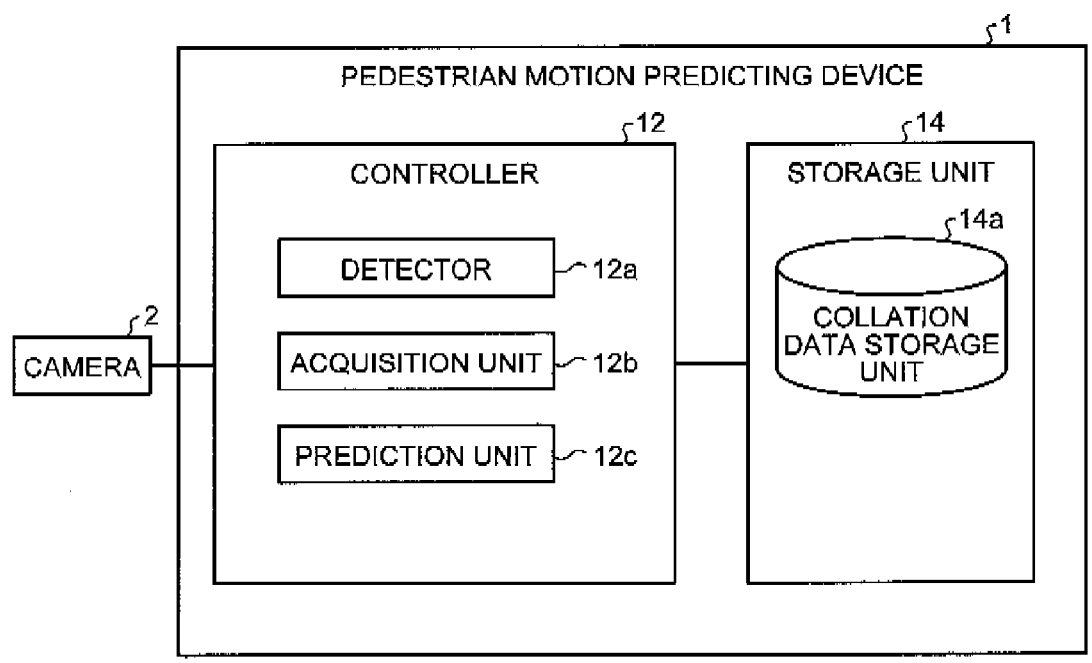
FIG. 1 is a block diagram illustrating an example of a configuration of a pedestrian motion predicting device according to a first embodiment.

FIG. 1 is a block diagram illustrating an example of the configuration of the pedestrian motion predicting device according to the first embodiment. A pedestrian motion predicting device 1 is configured using, for example, a general-purpose personal computer and the like and connected to a camera 2 mounted on a vehicle so as to be able to communicate therewith. The camera 2 is an instrument that picks up a periphery of a driver's own vehicle and creates image data in which the periphery of the driver's own vehicle is imaged.

The pedestrian motion predicting device 1 includes a controller 12 and a storage unit 14. The controller 12 integrally controls the pedestrian motion predicting device 1 and is, for example, a CPU (Central Processing Unit) and the like. The storage unit 14 stores data and is, for example, a RAM (Random Access Memory), a ROM (Read Only Memory), or a hard disk, and the like.

The storage unit 14 includes a collation data storage unit 14a. The collation data storage unit 14a is stored with a learning-finished identifier group or a pedestrian recognition template (image) group which can easily detect a shape of a pedestrian (for example, a forward inclination, an upper body direction, an opening of legs in a front-rear direction, an opening of the legs in a side direction, and the like) which likely occurs in variously changing traffic environments.

The controller 12 includes a detector 12a, an acquisition unit 121, and a prediction unit 12c. The detector 12a detects a pedestrian from the image data input from the camera 2. The acquisition unit 12b acquires a shape of the pedestrian detected by the detector 12a. The prediction unit 12c predicts the motion of the pedestrian (for example, rush out of the pedestrian and the like) based on the shape of the pedestrian acquired by the acquisition unit 12b.

Figure 2:
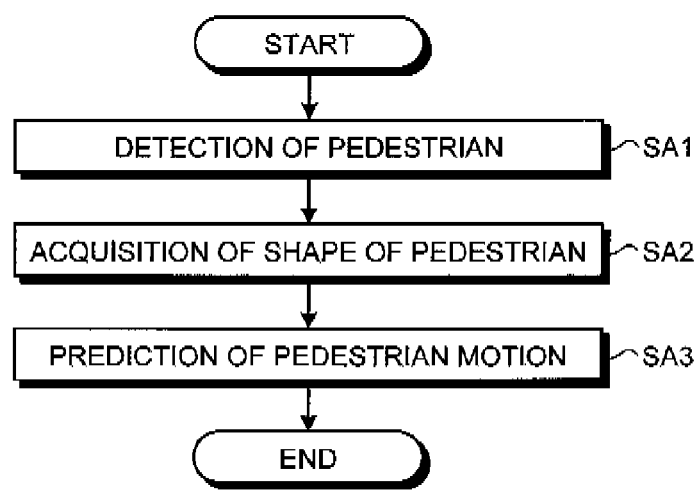
FIG. 2 is a flowchart illustrating an example of an operation carried out by the pedestrian motion predicting device according to the first embodiment.

FIG. 2 is a flowchart illustrating an example of an operation carried out by the pedestrian motion predicting device 1. First, the detector 12a detects the pedestrian from the image data input from the camera 2 and cuts out a portion in which the detected pedestrian is imaged from the image data (step SA1).

Figure 3:
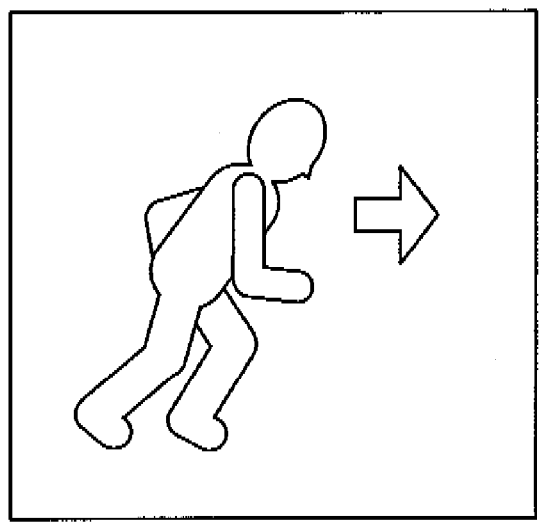
FIG. 3 is a view illustrating an example of a pedestrian rush out posture that likely occurs.
Figure 4:
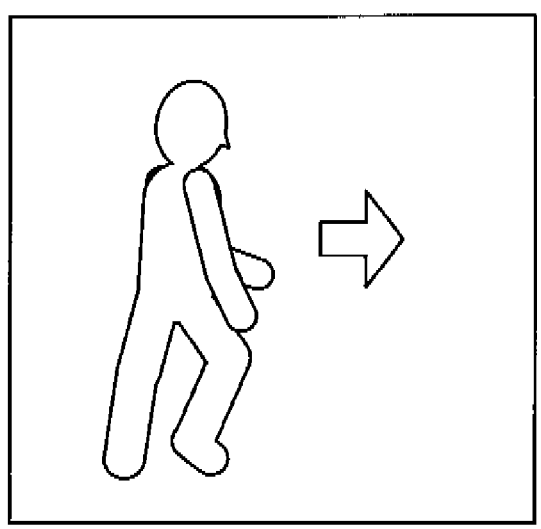
FIG. 4 is a view illustrating an example of the pedestrian rush out posture that likely occurs.
Figure 5:
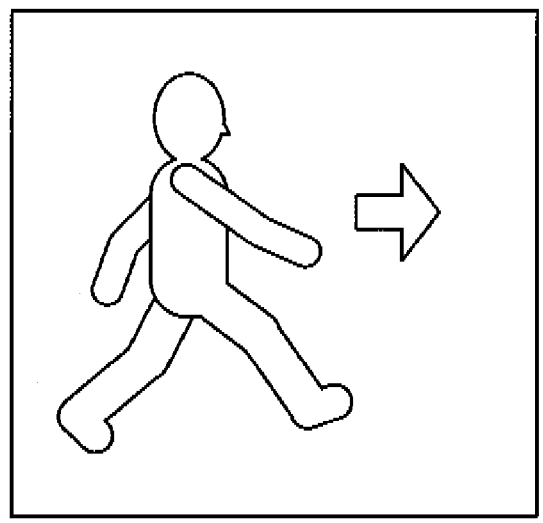
FIG. 5 is a view illustrating an example of the pedestrian rush out posture that likely occurs.
Figure 6:
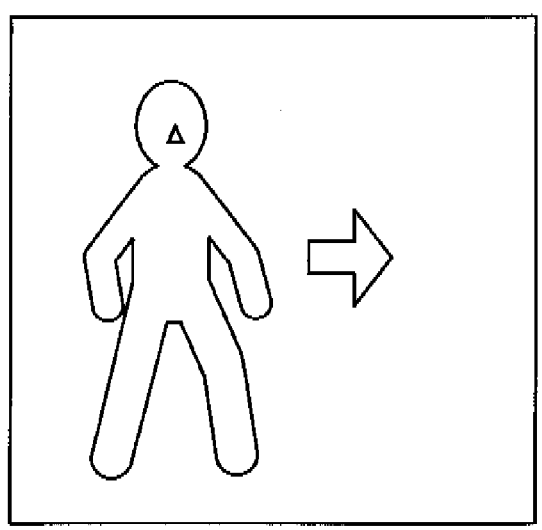
FIG. 6 is a view illustrating an example the pedestrian rush out posture that likely occurs.

Next, the acquisition unit 12b collates a shape of the pedestrian imaged in the partial image data cut out at step SA1 with the learning-finished identifier group or the pedestrian recognition template group stored in the collation data storage unit 14a to thereby classify the shape (step SA2). For example, the acquisition unit 12b extracts a feature vector (feature quantity) from the partial image data and identifies the extracted feature vector by an identification surface formed by the learning-finished identifier to thereby determine the class of the shape of the pedestrian imaged in the partial image data (for example, the class of the forward inclining posture as illustrated in FIG. 3, the class of the upper body direction as illustrated in FIG. 4, the class of the opening of the legs in a front-rear direction as illustrated in FIG. 5, the class of the opening of the legs in a side direction as illustrated in FIG. 6, and the like. As the feature quantity, there can be thought a quantity based on an edge such as SIFT, HOC, and the like, a quantity based on color, a quantity acquired by encoding the position of a feature portion such as a head, a hand, and the like. Further, for example, the acquisition unit 12b determines the class of the shape of the pedestrian imaged in the partial image data by collating the shape of the pedestrian imaged in the partial image data with a shape of a pedestrian of a pedestrian recognition template. The class of the shape of the pedestrian can be also classified to the class of "an ordinary walking motion" and the class of "the motion other than the ordinary walking motion" in addition to the classes illustrated in FIGS. 3, 4, 5, and 6.

Next, the prediction unit 12c predicts the motion of the pedestrian (for example, the direction in which the pedestrian will rush out and the like) based on the result of classification acquired at step SA2 (step SA3). When, for example, the result of classification relates to the class of the forward inclining posture, the prediction unit 12c predicts that the pedestrian will rush out in the forward inclining direction (arrow direction in FIG. 3). When, for example, the result of classification relates to the class of the upper body direction, the prediction unit 12c predicts that the pedestrian will rush out in the direction to which an upper body faces (arrow direction of FIG. 4). When, for example, the result of classification relates to the class of the opening of legs in the front-rear direction, the prediction unit 12c predicts that the pedestrian will rush out in a forward direction (arrow direction of FIG. 5). Further, when, for example, the result of classification relates to the class of the opening of the legs in the side direction, the prediction unit 12c predicts that the pedestrian will rush out in his left direction (arrow direction of FIG. 6). When the class of the shape of the pedestrian is classified to the class of "the ordinary walking motion" and to the class of "the motion other than the ordinary walking motion", the prediction unit 12c predicts only a case that the pedestrian will rush out and a case that the pedestrian will not rush out.

[Second Embodiment]

A configuration of a pedestrian motion predicting device according to a second embodiment and an operation carried out by the pedestrian motion predicting device will be explained in detail referring to FIG. 7 and FIG. 8. Note that some of contents overlapped with those explained in the first embodiment may be omitted.

Figure 7:
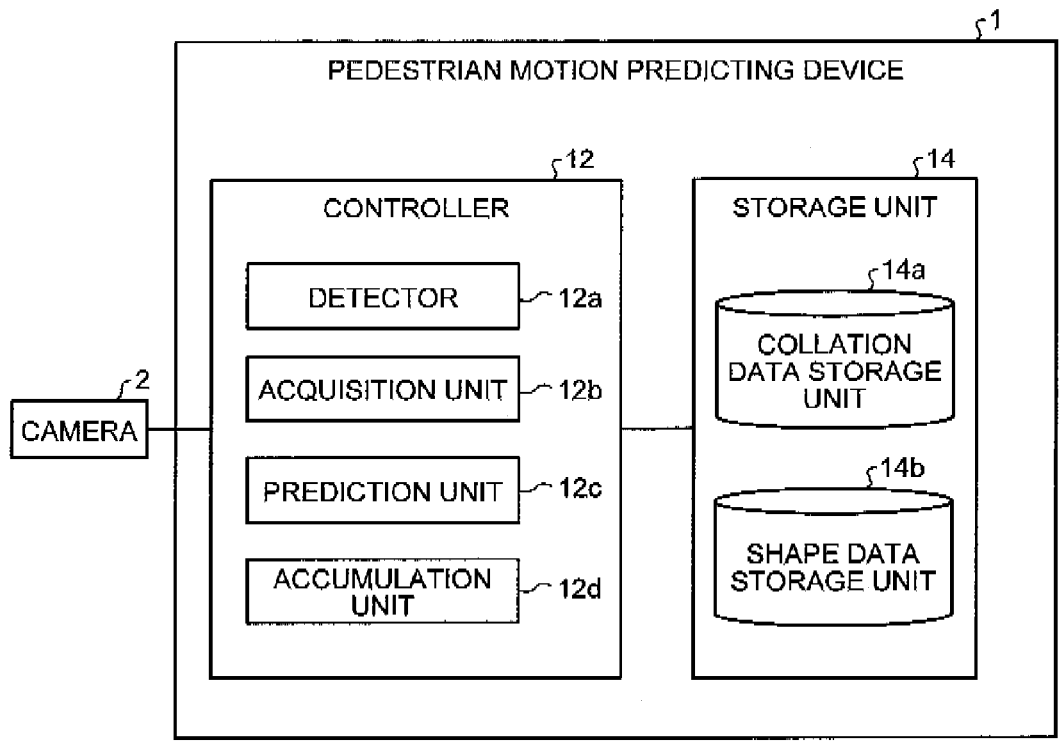
FIG. 7 is a block diagram illustrating an example of a configuration of a pedestrian motion predicting device according to a second embodiment.

FIG. 7 is a block diagram illustrating an example of the configuration of the pedestrian motion predicting device according to the second embodiment. A controller 12 further includes an accumulation unit 12d in addition to the detector 12a, the acquisition unit 12b, and the prediction unit 12c explained in the first embodiment. A storage unit 14 further includes a shape data storage unit 14b in addition to the collation data storage unit 14a explained in the first embodiment.

The accumulation unit 12d accumulates shapes of a pedestrian acquired by the acquisition unit 12b in the shape data storage unit 14b. The prediction unit 12c predicts the motion of the pedestrian (for example, rush out and the like of the pedestrian) based on a combination of the shapes of the pedestrian accumulated in the shape data storage unit 14b. The shape data storage unit 14b stores data as to the shapes of the pedestrian.

Figure 8:
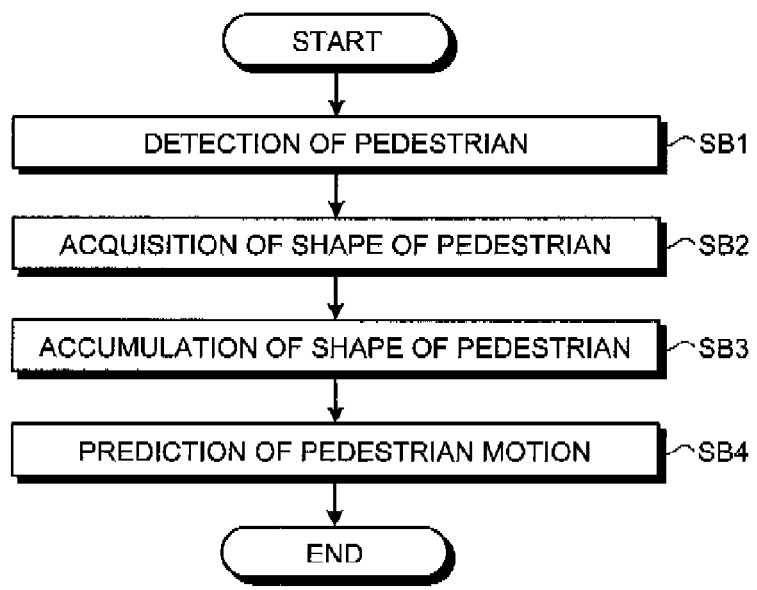
FIG. 8 is a flowchart illustrating an example of an operation carried out by the pedestrian motion predicting device according to the second embodiment.

FIG. 8 is a flowchart illustrating an example of the operation carried out by the pedestrian motion predicting device according to the second embodiment. First, the detector 12a detects the pedestrian from the image data input from a camera 2 and cuts out a portion in which the detected pedestrian is imaged from the image data (step SB1).

Next, the acquisition unit 12b collates the shape of the pedestrian imaged in the partial image data cut out at step SB1 with a learning-finished identifier group or a pedestrian recognition template group stored in the collation data storage unit 14a to thereby classify the shape (step SB2).

Next, the accumulation unit 12d accumulates the result of classification acquired at step SB2 in the shape data storage unit 14b (step SB3).

Next, the prediction unit 12c predicts the motion of the pedestrian (for example, the direction in which the pedestrian will rush out or the speed at which the pedestrian will rush out, and the like) based on a combination of the result of classification stored in the shape data storage unit 14b (step SB4). When, for example, at a certain time, the result of classification as to the shape of the pedestrian imaged in the partial image data is the class as to the upper body direction and, at a time after the certain time, when the result of classification as to the shape of the pedestrian imaged in the partial image data is the class as to the forward inclining posture, the prediction unit 12c regards that the posture of the pedestrian changes from a state that it is just going to move to a state that it begins to move to thereby predict that the pedestrian will rush out in a forward inclining direction.

[Third Embodiment]

A configuration of a pedestrian motion predicting device according to a third embodiment and an operation carried out by the pedestrian motion predicting device will be explained in detail referring from FIG. 9 to FIG. 11. Note that the contents overlapped with those explained in the first embodiment or the second embodiment may be omitted.

Figure 9:
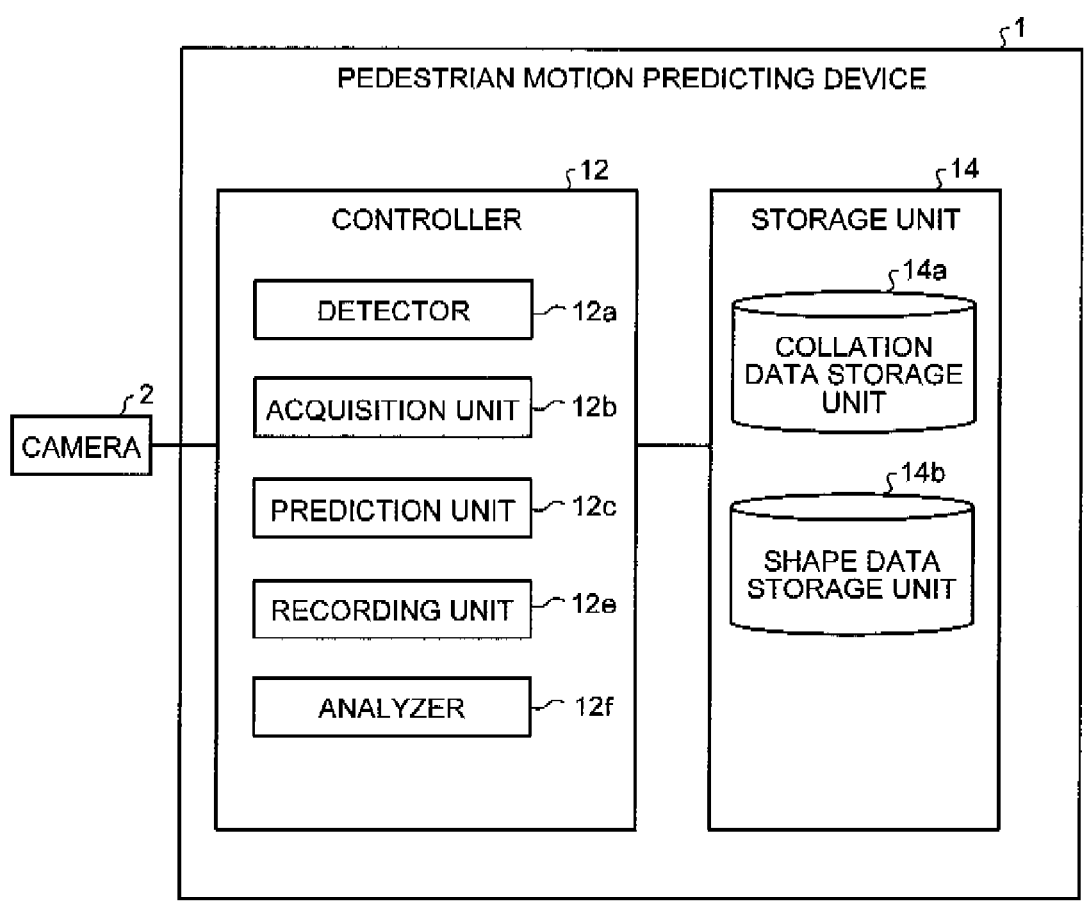
FIG. 9 is a block diagram illustrating an example of a configuration of a pedestrian motion predicting device according to a third embodiment.

FIG. 9 is a block diagram illustrating an example of the configuration of the pedestrian motion predicting device according to the third embodiment. A controller 12 further includes a recording unit 12e and an analyzer 12f in addition to the detector 12a, the acquisition unit 12b, and the prediction unit 12c explained in the first embodiment. A storage unit 14 further includes a shape data storage unit 14b in addition to the collation data storage unit 14a explained in the first embodiment.

The recording unit 12e records shapes of a pedestrian acquired by the acquisition unit 12b in the shape data storage unit 14b in time series. Based on the shapes of the pedestrian in time series recorded in the shape data storage unit 14b, the analyzer 12f analyzes the periodicity of the shapes (for example, the periodic changes and the like of the shapes of the pedestrian). Based on the results of analysis in the analyzer 12f, the prediction unit 12c predicts the motion of the pedestrian (for example, rush out and the like of the pedestrian). The shape data storage unit 14b stores the data as to the shapes of the pedestrian in time series.

Figure 10:
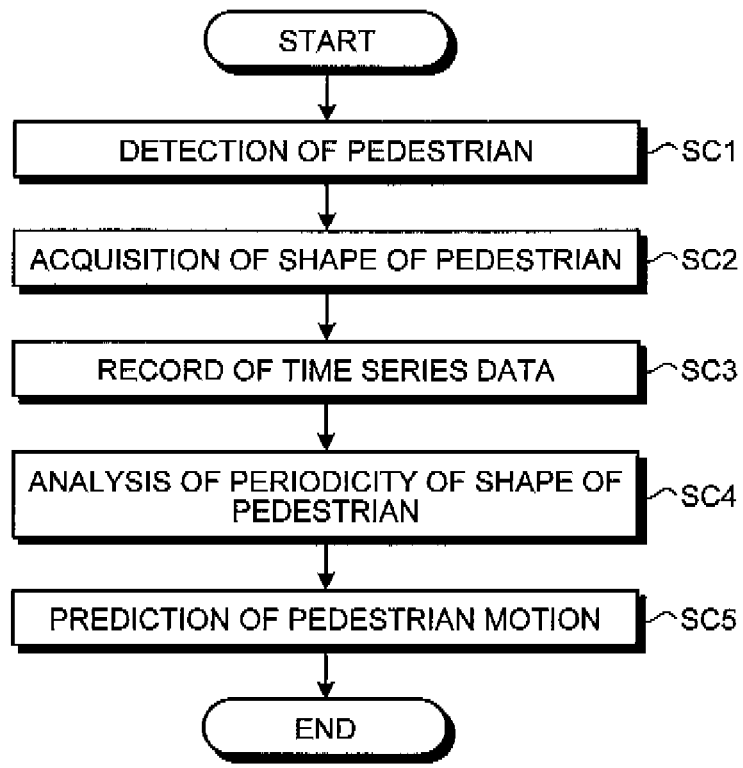
FIG. 10 is a flowchart illustrating an example of an operation carried out by the pedestrian motion predicting device according to the third embodiment.
Figure 11:
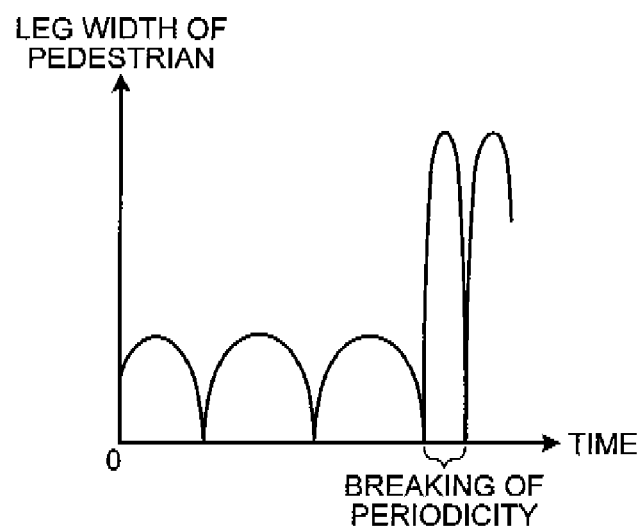
FIG. 11 is a view illustrating an example of a periodic change of a shape of a pedestrian.

FIG. 10 is a flowchart illustrating an example an operation carried out by the pedestrian motion predicting device according to the third embodiment. First, the detector 12a detects the pedestrian from the image data input from a camera 2 and cuts out a portion in which the detected pedestrian is imaged from the image data (step SC1).

Next, the acquisition unit 12b collates the shapes of the pedestrian imaged in the partial image data cut out at step SC1 with a learning-finished identifier group or a pedestrian recognition template group stored in the collation data storage unit 14a to thereby classify the shapes (step SC2). Otherwise, the acquisition unit 12b holds feature quantities themselves as the shapes of the pedestrian.

Next, the recording unit 12e records the results of classification acquired at step SC2 or the feature quantities themselves in the shape data storage unit 14b in time series (step SC3).

Next, based on the results of classification in time series recorded in the shape data storage unit 14b or on the feature quantities themselves, the analyzer 12f analyzes the periodicity of the shape of the pedestrian (step SC4). For example, the analyzer 12f detects a breaking of the periodicity from the periodic change as to the leg width of the pedestrian illustrated in FIG. 11 which can be acquired from the results of classification in time series. Otherwise, the analyzer 12f detects the breaking of the periodicity by putting a certain distance or its equivalent distance such as a Kullback-Leibler information amount and the like in a feature quantity space and calculating the degree of similarity to an n previous frame.

Next, based on the result of analysis of the periodicity (change of periodicity) acquired at step SC4, the prediction unit 12c predicts the motion of the pedestrian (for example, the rush out direction of the pedestrian or the rush out speed of the pedestrian, and the like) (step SC5). When, for example, the breaking of the periodicity is detected at step SC4, the prediction unit 12c predicts that the pedestrian will rush out at the time the breaking of the periodicity occurs (refer to FIG. 11). Further, as illustrated in, for example, FIG. 11, based on the leg width change amount of the pedestrian before or after the time at which the breaking of the periodicity occurs, the prediction unit 12c predicts that the pedestrian will rush out at a speed in accordance with the change amount. Note that, based on the shapes of the pedestrian in time series (the results of classification in time series) recorded in the shape data storage unit 14b, the prediction unit 12c may determine whether or not the moving speed of the pedestrian (moving direction and speed) is continuous and may predict the rush out direction and the rush out speed of the pedestrian based on the result of determination.

[Summary of Embodiments]

The embodiments described above predict the rush out of a pedestrian by capturing the change of posture or motion which acts as a sign of the rush out of the pedestrian into the roadway. Specifically, the shape of the pedestrian detected by a sensor is collated with information on a shape of a pedestrian as to the motion, which acts as a telltale sign, of a pedestrian having a possibility of rush out, and the rush out of the pedestrian is predicted based on the result of the collation. In this way, a possibility of rush out can be accurately predicted before the pedestrian actually begins to rush out.

According to the embodiments, since the rush out of the pedestrian is predicted by a combination of the shape of the pedestrian detected at a certain moment and the shape of the pedestrian detected thereafter, the prediction accuracy of a possibility of rush out can be improved. According to the embodiments, since the time series information of the detected shape of the pedestrian is recorded, the periodicity of the shape of the pedestrian is analyzed based on the time series information, and the rush out of the pedestrian is predicted based on the change of periodicity of the shape of the pedestrian acquired by the analysis, the prediction accuracy of the possibility of rush out can be improved. According to the embodiments, since the time series information of the detected shape of the pedestrian is recorded, the continuity of a pedestrian speed is analyzed based on the time series information, and the rush out of the pedestrian is predicted based on the change of continuity of the pedestrian speed acquired by the analysis, the prediction accuracy of the possibility of rush out can be improved. Further, according to the embodiments, as the shape of the pedestrian, at least one of the forward inclination posture, the upper body direction, the opening of the legs in the front-rear direction, and the opening of the legs in the side direction of the pedestrian is acquired, the prediction accuracy of the possibility of rush out can be improved.

INDUSTRIAL APPLICABILITY

As described above, the pedestrian motion predicting device according to the present invention is useful in vehicle manufacturing industries and, in particular, suitable to predict the rush out of a pedestrian in a periphery of a vehicle.

REFERENCE SIGNS LIST pedestrian motion predicting device
12 controller
12a detector
12b acquisition unit
12c prediction unit
12d accumulation unit
12e recording unit
12f analyzer
14 storage unit
14a collation data storage unit
14b shape data storage unit
2 camera

The invention claimed is:
1. A pedestrian motion predicting device comprising:
a photographing unit mounted on a vehicle, the photographing unit configured to photograph a periphery of the vehicle and to create image data of the periphery of the vehicle;
a controller; and
a data storage, wherein
the controller receives the image data from the photographing unit, and the controller is configured to detect a pedestrian from the image data;
the controller is configured to acquire leg width values of the pedestrian from the image, each of the leg width values being a space between legs of the pedestrian;
the data storage configured to store the leg width values of the pedestrian in time series acquired by the controller;
the controller is configured to analyze a periodicity of the leg width values based on the leg width values of the pedestrian in time series stored in the data storage; and
the controller is configured to detect a break in the periodicity of the leg width values and to predict, based on a leg width change amount, whether the pedestrian will rush out at a speed according to the leg width change amount, the leg width change amount being a difference between a leg width value before the break in periodicity and a leg width value after the break in periodicity.

2. The pedestrian motion predicting device according to claim 1, wherein
the data storage is configured to store learning-finished identifier group data or pedestrian recognition template group data, and
the controller detects shapes of the pedestrian from the image data and collates the shapes of the pedestrian with the learning-finished identifier group data or the pedestrian recognition template group data stored in the data storage, thereby classifying the shapes of the pedestrian.

3. The pedestrian motion predicting device according to claim 2, wherein
the data storage is configured to store in time series a result of a classification of the shapes of the pedestrian,
the controller is configured to determine, based on the result of the classification stored in time series, whether a moving direction and a speed of the pedestrian are continuous, and
the controller is configured to predict a rush out direction and a rush out speed of the pedestrian based on a result of determination.

4. A pedestrian motion predicting method, comprising;
photographing a periphery of a vehicle and creating image data of the periphery of the vehicle by a photographing unit mounted on the vehicle;
receiving the image data from the photographing unit by a controller;
acquiring by the controller leg width values of the pedestrian from the image data, each of the leg width values being a space between legs of the pedestrian;
storing the leg width values of the pedestrian in time series in a data storage;
analyzing by the controller a periodicity of the leg width values based on the leg width values of the pedestrian in time series stored in the data storage; and
detecting by the controller a break in the periodicity of the leg width values and predicting by the controller, based on a leg width change amount, whether the pedestrian will rush out at a speed according to the leg width change amount, the leg width change amount being a difference between a leg width value before the break in periodicity and a leg width value after the break in periodicity.

5. The pedestrian motion predicting method according to claim 4, further comprising:
detecting by the controller shapes of the pedestrian from the image data; and
collating by the controller the shapes of the pedestrian with learning-finished identifier group data or pedestrian recognition template group data stored in the data storage, thereby classifying the shapes of the pedestrian.

6. The pedestrian motion predicting method according to claim 5, further comprising:
- storing a result of a classification of the shapes of the pedestrian in time series in the data storage,
- determining by the controller, based on the result of the classification stored in time series, whether a moving direction and a speed of the pedestrian are continuous, and
- predicting by the controller a rush out direction and a rush out speed of the pedestrian based on a result of determination.

* * * * *